(12) United States Patent
Salvestrini

(10) Patent No.: US 8,729,814 B2
(45) Date of Patent: May 20, 2014

(54) TWO-WIRE ANALOG FET-BASED DIMMER SWITCH

(75) Inventor: Christopher James Salvestrini, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 402 days.

(21) Appl. No.: 12/953,057

(22) Filed: Nov. 23, 2010

(65) Prior Publication Data

US 2011/0121812 A1    May 26, 2011

Related U.S. Application Data

(60) Provisional application No. 61/333,050, filed on May 10, 2010, provisional application No. 61/264,528, filed on Nov. 25, 2009.

(51) Int. Cl.
*H05B 37/02* (2006.01)

(52) U.S. Cl.
USPC .......................................... 315/224; 315/291

(58) Field of Classification Search
USPC ............. 315/209 R, 224–226, 238–239, 247, 315/276, 291, 307, 308, 363; 323/220, 222, 323/224, 231, 265, 271–272; 307/112–115, 307/139–141
See application file for complete search history.

(56) References Cited

U.S. PATENT DOCUMENTS

| | | | |
|---|---|---|---|
| 3,333,204 A * | 7/1967 | Schonholzer | ................. 327/237 |
| 3,731,182 A | 5/1973 | Hirono et al. | |
| 3,763,396 A | 10/1973 | Shilling | |
| 4,870,340 A | 9/1989 | Kral | |
| 4,876,498 A * | 10/1989 | Luchaco et al. | ............. 323/300 |
| 4,954,768 A | 9/1990 | Luchaco et al. | |
| 5,004,969 A | 4/1991 | Schanin | |
| 5,038,081 A | 8/1991 | Maiale, Jr. et al. | |

(Continued)

FOREIGN PATENT DOCUMENTS

| EP | 0674390 | 3/1994 |
|---|---|---|
| EP | 2 020 830 | 2/2009 |

(Continued)

OTHER PUBLICATIONS

International Search Report and Written Opinion dated Mar. 2, 2011 issued in corresponding PCT International Application No. PCT/US2010/057953.

(Continued)

*Primary Examiner* — Rajnikant Patel
(74) *Attorney, Agent, or Firm* — Ostrolenk Faber LLP

(57) ABSTRACT

A two-wire load control device, such as, a dimmer switch, for controlling the amount of power delivered from an AC power source to an electrical load comprise a bidirectional semiconductor switch having first and second anti-series connected switching transistors (such as, for example, field-effect transistors) that are adapted to be coupled between the source and the load, and are controlled to be conductive and non-conductive in a complementary basis. The bidirectional semiconductor switch is operable to be rendered conductive and to remain conductive independent of the magnitude of a load current conducted through semiconductor switch. The dimmer switch also comprises a drive circuit for rendering the first and second switching transistors conductive and non-conductive each half-cycle on the complementary basis, so as to control the amount of power delivered to the electrical load to a desired amount of power.

59 Claims, 6 Drawing Sheets

(56) References Cited

U.S. PATENT DOCUMENTS

| | | | |
|---|---|---|---|
| 5,237,244 A | | 8/1993 | Bertenshaw et al. |
| 5,239,255 A | | 8/1993 | Schanin et al. |
| 5,319,301 A | | 6/1994 | Callahan et al. |
| 5,491,402 A | * | 2/1996 | Small .................... 323/282 |
| 5,629,607 A | | 5/1997 | Callahan et al. |
| 5,672,941 A | | 9/1997 | Callahan et al. |
| 5,821,703 A | | 10/1998 | Callahan et al. |
| 5,852,559 A | * | 12/1998 | Li ........................ 363/163 |
| 5,861,720 A | | 1/1999 | Johnson |
| 5,861,721 A | | 1/1999 | Johnson |
| 5,923,662 A | | 7/1999 | Stirling et al. |
| 5,926,115 A | | 7/1999 | Schleder et al. |
| 5,946,316 A | | 8/1999 | Chen et al. |
| 6,021,055 A | * | 2/2000 | Parry ..................... 363/49 |
| 6,212,249 B1 | | 4/2001 | Shin |
| 6,294,901 B1 | | 9/2001 | Peron |
| 6,700,333 B1 | | 3/2004 | Hirshi et al. |
| 6,802,728 B1 | | 10/2004 | Howell et al. |
| 6,933,686 B1 | | 8/2005 | Bishel |
| 6,975,078 B2 | | 12/2005 | Yanai et al. |
| 7,119,497 B2 | | 10/2006 | Gonthier et al. |
| 7,190,124 B2 | * | 3/2007 | Kumar et al. .......... 315/224 |
| 7,339,331 B2 | | 3/2008 | Vanderzon |
| 7,480,128 B2 | | 1/2009 | Black |
| 7,570,031 B2 | * | 8/2009 | Salvestrini ............. 323/223 |
| 7,619,365 B2 | | 11/2009 | Davis et al. |
| 7,868,561 B2 | * | 1/2011 | Weightman et al. ..... 315/294 |
| 8,198,820 B2 | | 6/2012 | Weightman et al. |
| 8,242,714 B2 | | 8/2012 | Weightman et al. |
| 2004/0183474 A1 | | 9/2004 | Moisin |
| 2005/0004916 A1 | | 1/2005 | Miller et al. |
| 2005/0168200 A1 | | 8/2005 | Vanderzon |
| 2005/0168896 A1 | | 8/2005 | Vanderzon |
| 2005/0174070 A1 | | 8/2005 | Vanderzon |
| 2005/0189929 A1 | | 9/2005 | Schulz |
| 2005/0275354 A1 | | 12/2005 | Hausman et al. |
| 2006/0109702 A1 | * | 5/2006 | Weightman ............. 363/149 |
| 2006/0255745 A1 | | 11/2006 | DeJong et al. |
| 2007/0001654 A1 | | 1/2007 | Newman |
| 2007/0182347 A1 | | 8/2007 | Shteynberg et al. |
| 2007/0217237 A1 | * | 9/2007 | Salvestrini ............. 363/125 |
| 2008/0029108 A1 | | 2/2008 | Catron et al. |
| 2008/0224624 A1 | | 9/2008 | Richter |
| 2009/0108765 A1 | | 4/2009 | Weightman et al. |
| 2009/0160627 A1 | | 6/2009 | Godbole |
| 2009/0200952 A1 | | 8/2009 | King |
| 2010/0259196 A1 | | 10/2010 | Sadwick et al. |
| 2010/0270982 A1 | | 10/2010 | Hausman, Jr. et al. |
| 2011/0121752 A1 | | 5/2011 | Newman, Jr. et al. |
| 2012/0033471 A1 | | 2/2012 | Newman, Jr. |
| 2012/0230073 A1 | | 9/2012 | Newman, Jr. et al. |
| 2013/0170263 A1 | | 7/2013 | Newman, Jr. et al. |

FOREIGN PATENT DOCUMENTS

| | | |
|---|---|---|
| EP | 2020830 A2 | 2/2009 |
| FR | 2859580 | 3/2005 |
| GB | 2155256 A | 9/1985 |
| WO | WO 99/20082 | 4/1999 |
| WO | WO-03/005550 A1 | 1/2003 |
| WO | WO-2005/115058 | 12/2005 |

OTHER PUBLICATIONS

Written Opinion dated Jan. 23, 2012 issued in corresponding PCT International Application No. PCT/US2010/057949.

International Preliminary Report on Patentability dated Mar. 2, 2012 issued in corresponding PCT International Application No. PCT/US10/57949.

International Preliminary Report on Patentability dated Mar. 6, 2012 issued in corresponding PCT International Application No. PCT/US10/57382.

International Search Report and Written Opinion dated Mar. 3, 2011 in corresponding International Application No. PCT/US2010/057949.

International Search Report and Written Opinion dated Dec. 5, 2012 in corresponding International Application No. PCT/US2012/055024.

International Preliminary Report on Patentability dated Mar. 22, 2012 issued in PCT International Application No. PCT/US10/57953.

International Preliminary Report on Patentability dated Apr. 25, 2011 issued in corresponding PCT International Application No. PCT/US08/12259.

Description of Lutron Rania Dimmer Switch, pp. 1-3, Figures 1 and 2, dimmer switch available to the public as early as 2007.

* cited by examiner

TWO-WIRE ANALOG FET-BASED DIMMER SWITCH

This application is related to commonly-assigned U.S. Provisional Patent Application No. 61/264,528, filed Nov. 25, 2009, and U.S. Provisional Patent Application No. 61/333,050, filed May 10, 2010, both entitled TWO-WIRE ANALOG DIMMER SWITCH FOR LOW-POWER LOADS, the entire disclosures of which are hereby incorporated by reference.

BACKGROUND OF THE INVENTION

1. Field of the Invention

The present invention relates to load control devices for controlling the amount of power delivered to an electrical load, and more particularly, to a two-wire analog dimmer switch that has substantially no minimum load requirement and comprises two anti-series-connected field-effect transistors (FETs) that are controlled in a complementary basis.

2. Description of the Related Art

Prior art two-wire dimmer switches are coupled in series electrical connection between an alternating-current (AC) power source and a lighting load for controlling the amount of power delivered from the AC power source to the lighting load. A two-wire wall-mounted dimmer switch is adapted to be mounted to a standard electrical wallbox and comprises two load terminals: a hot terminal adapted to be coupled to the hot side of the AC power source and a dimmed hot terminal adapted to be coupled to the lighting load. In other words, the two-wire dimmer switch does not require a connection to the neutral side of the AC power source (i.e., the load control device is a "two-wire" device). Prior art "three-way" dimmer switches may be used in three-way lighting systems and comprise at least three load terminals, but do not require a connection to the neutral side of the AC power source.

The dimmer switch typically comprises a bidirectional semiconductor switch, e.g., a thryristor (such as a triac) or two field-effect transistors (FETs) in anti-series connection. The bidirectional semiconductor switch is coupled in series between the AC power source and the load and is controlled to be conductive and non-conductive for portions of a half-cycle of the AC power source to thus control the amount of power delivered to the electrical load. Generally, dimmer switches use either a forward phase-control dimming technique or a reverse phase-control dimming technique in order to control when the bidirectional semiconductor switch is rendered conductive and non-conductive to thus control the power delivered to the load. The dimmer switch may comprise a toggle actuator for turning the lighting load on and off and an intensity adjustment actuator for adjusting the intensity of the lighting load. Examples of prior art dimmer switches are described in greater detail is commonly-assigned U.S. Pat. No. 5,248,919, issued Sep. 29, 1993, entitled LIGHTING CONTROL DEVICE; U.S. Pat. No. 6,969,959, issued Nov. 29, 2005, entitled ELECTRONIC CONTROL SYSTEMS AND METHODS; and U.S. Pat. No. 7,687,940, issued Mar. 30, 2010, entitled DIMMER SWITCH FOR USE WITH LIGHTING CIRCUITS HAVING THREE-WAY SWITCHES, the entire disclosures of which are hereby incorporated by reference.

With forward phase-control dimming, the bidirectional semiconductor switch is rendered conductive at some point within each AC line voltage half-cycle and remains conductive until approximately the next voltage zero-crossing, such that the bidirectional semiconductor switch is conductive for a conduction time each half-cycle. A zero-crossing is defined as the time at which the AC line voltage transitions from positive to negative polarity, or from negative to positive polarity, at the beginning of each half-cycle. Forward phase-control dimming is often used to control energy delivered to a resistive or inductive load, which may include, for example, a magnetic low-voltage transformer or an incandescent lamp. The bidirectional semiconductor switch of a forward phase-control dimmer switch is typically implemented as a thyristor, such as a triac or two silicon-controlled rectifiers (SCRs) coupled in anti-parallel connection, since a thyristor becomes non-conductive when the magnitude of the current conducted through the thyristor decreases to approximately zero amps.

Many forward phase-control dimmers include analog control circuits (such as timing circuits) for controlling when the thyristor is rendered conductive each half-cycle of the AC power source. The analog control circuits each typically comprise a potentiometer, which may be adjusted in response to a user input provided from, for example, a linear slider control or a rotary knob in order to control the amount of power delivered to the lighting load. The analog control circuit is typically coupled in parallel with the thyristor and conducts a small timing current through the lighting load when the thyristor is non-conductive. The magnitude of the timing current is small enough such that the controlled lighting load is not illuminated to a level that is perceptible to the human eye when the lighting load is off.

Thyristors are typically characterized by a rated latching current and a rated holding current, and comprise two main terminals and a control terminal. The current conducted through the main terminals of the thyristor must exceed the latching current for the thyristor to become fully conductive. In addition, the current conducted through the main terminals of the thyristor must remain above the holding current for the thyristor to remain in full conduction. Since an incandescent lamp is a resistive lighting load, a typical forward phase-control dimmer switch is operable to conduct enough current through the incandescent lamp to exceed the rated latching and holding currents of the thyristor if the impedance of the incandescent lamp is low enough. Therefore, prior art forward phase-control dimmer switches are typically rated to operate appropriately with lighting loads having a power rating above a minimum power rating (e.g., approximately 40 W) to guarantee that the thyristor will be able to latch and remained latched when dimming the lighting load.

With reverse phase-control dimming, the bidirectional semiconductor switch is rendered conductive at the zero-crossing of the AC line voltage and rendered non-conductive at some point within each half-cycle of the AC line voltage, such that the bidirectional semiconductor switch is conductive for a conduction time each half-cycle. Reverse phase-control dimming is often used to control energy to a capacitive load, which may include, for example, an electronic low-voltage transformer. Since the bidirectional semiconductor switch must be rendered conductive at the beginning of the half-cycle, and must be able to be rendered non-conductive within the half-cycle, reverse phase-control dimming requires that the dimmer switch have two FETs in anti-serial connection, or the like. A FET is operable to be rendered conductive and to remain conductive independent of the magnitude of the current conducted through the FET. In other words, a FET is not limited by a rated latching or holding current as is a thyristor. However, prior art reverse phase-control dimmer switches have either required neutral connections and/or advanced control circuits (such as microprocessors) for controlling the operation of the FETs. In order to power a microprocessor, the dimmer switch must also comprise a power supply, which is typically coupled in parallel with the FETs. These advanced control circuits and power supplies add to the cost of prior art FET-based reverse phase-control dimmer switches (as compared to analog forward phase-control dimmer switches).

Further, in order to properly charge, the power supply of such a two-wire dimmer switch must develop an amount of voltage across the power supply and must conduct a charging current from the AC power source through the electrical load, in many instances even when the lighting load is off. If the power rating of the lighting load is too low, the charging current conducted by the power supply through the lighting load may be great enough to cause the lighting load to illuminate to a level that is perceptible to the human eye when the lighting load is off. Therefore, prior art FET-based reverse phase-control dimmer switches are typically rated to operate appropriately with lighting loads having a power rating above a minimum power rating to guarantee that the lighting load does not illuminate to a level that is perceptible to the human eye due to the power supply current when the lighting load is off. Some prior art load control devices, have included power supplies that only develop small voltages and draw small currents when charging, such that the minimum power rating of a controlling lighting load may be as low as 10 W. An example of such a power supply is described in greater detail in commonly-assigned U.S. patent application Ser. No. 12/751,324, filed Mar. 30, 2010, entitled SMART ELECTRONIC SWITCH FOR LOW-POWER LOADS, the entire disclosure of which is hereby incorporated by reference.

Nevertheless, it is desirable to be able to control the amount of power to electrical loads having power rating lower than those able to be controlled by the prior art forward and reverse phase-control dimmer switches. In order to save energy, high-efficiency lighting loads, such as, for example, compact fluorescent lamps (CFLs) and light-emitting diode (LED) light sources, are being used in place of or as replacements for conventional incandescent or halogen lamps. High-efficiency light sources typically consume less power and provide longer operational lives as compared to incandescent and halogen lamps. In order to illuminate properly, a load regulation device (e.g., such as an electronic dimming ballast or an LED driver) must be coupled between the AC power source and the respective high-efficiency light source (i.e., the compact fluorescent lamp or the LED light source) for regulating the power supplied to the high-efficiency light source.

A dimmer switch controlling a high-efficiency light source may be coupled in series between the AC power source and the load control device for the high-efficiency light source. Some high-efficiency lighting loads are integrally housed with the load regulation devices in a single enclosure. Such an enclosure may have a screw-in base that allows for mechanical attachment to standard Edison sockets and provide electrical connections to the neutral side of the AC power source and either the hot side of the AC power source or the dimmed-hot terminal of the dimmer switch (e.g., for receipt of the phase-control voltage). The load regulation circuit is operable to control the intensity of the high-efficiency light source to the desired intensity in response to the conduction time of the bidirectional semiconductor switch of the dimmer switch.

However, the load regulation devices for the high-efficiency light sources may have high input impedances or input impedances that vary in magnitude throughout a half-cycle. Therefore, when a prior-art forward phase-control dimmer switch is coupled between the AC power source and the load regulation device for the high-efficiency light source, the load control device may not be able to conduct enough current to exceed the rated latching and/or holding currents of the thyristor. In addition, when a prior-art reverse phase-control dimmer switch is coupled between the AC power source and the load regulation device, the magnitude of the charging current of the power supply may be great enough to cause the load regulation device to illuminate the controlled high-efficiency light source to a level that is perceptible by the human eye when the light source should be off.

The impedance characteristics of the load regulation device may negatively affect the magnitude of the phase-control voltage received by the load regulation device, such that the conduction time of the received phase-control voltage is different from the actually conduction time of the bidirectional semiconductor switch of the dimmer switch (e.g., if the load regulation device has a capacitive impedance). Therefore, the load regulation device may control the intensity of the high-efficiency light source to an intensity that is different than the desired intensity as directed by the dimmer switch. In addition, the charging current of the power supply of the dimmer switch may build up charge at the input of a load regulation device having a capacitive input impedance, thus negatively affecting the low-end intensity that may be achieved.

Therefore, there exists a need for a two-wire load control device that may be coupled between an AC power source and a load regulation device for a high-efficiency light source and is able to properly control the intensity of the high-efficiency light source.

SUMMARY OF THE INVENTION

According to an embodiment of the present invention, a load control device (such as, for example, a dimmer switch) for controlling the amount of power delivered from an AC power source to an electrical load comprise a bidirectional semiconductor switch having first and second anti-series connected switching transistors (e.g., field-effect transistors) that are adapted to be coupled between the source and the load, and are controlled to be conductive and non-conductive in a complementary basis. Accordingly, the bidirectional semiconductor switch of the dimmer switch is operable to be rendered conductive and to remain conductive independent of the magnitude of a load current conducted through semiconductor switch. The dimmer switch also comprises a drive circuit for rendering the first and second switching transistors conductive and non-conductive each half-cycle on a complementary basis, so as to control the amount of power delivered to the electrical load to the desired amount.

According to another embodiment of the present invention, the dimmer switch includes an analog control circuit, such as, for example, a timing circuit, which generates a timing voltage that is representative of a desired amount of power to be delivered to the electrical load. The drive circuit receives the timing voltage and independently renders the bidirectional semiconductor switch conductive and non-conductive each half-cycle in response to the timing voltage, so as to control the amount of power delivered to the electrical load to the desired amount.

According to yet another embodiment of the present invention, a two-wire load control circuit for coupling in series between an AC source voltage and a load device comprises a controllable bidirectional switch for coupling selected portions of positive and negative half-cycles of the AC source voltage to the load device, a timing circuit coupled to the AC source voltage for producing a timing signal, and a gate drive circuit receiving the timing signal and producing separate first and second drive signals for causing the bidirectional switch to be conductive for the selected portions of the positive and negative half-cycles, respectively, thereby to provide current to the load device from the AC voltage source during the selected portions of the respective positive and negative half-cycles. The gate drive circuit produces the first drive signal during the positive half-cycle and the second drive signal during the negative half-cycle.

In addition, a gate drive circuit for driving first and second anti-series-connected switching transistors in a two-wire load control device for controlling the amount of power delivered from an AC power source to an electrical load is also described herein. The gate drive circuit is configured for receipt of a timing voltage representative of a desired amount of power to be delivered to the electrical load. The gate drive circuit is adapted to be coupled to control inputs of the switching transistors for controlling the switching transistors to be conductive and non-conductive in response to the timing voltage.

According to one embodiment of the present invention, the gate drive circuit comprises: (1) a first capacitor adapted to be coupled to the control input of the first switching transistor for rendering the switching transistor conductive during the positive half-cycles of the AC power source; (2) a second capacitor adapted to be coupled to the control input of the second switching transistor for rendering the switching transistor conductive during the negative half-cycles of the AC power source; (3) a first pulse transformer having a secondary winding operatively coupled to the first capacitor; (4) a second pulse transformer having a secondary winding operatively coupled to the second capacitor; and (5) a triggering circuit coupled in series with primary windings of the first and second pulse transformers. The triggering circuit conducts a pulse of current through the primary windings of the pulse transformers in response to the timing voltage for charging the first capacitor during the positive half-cycles and the second capacitor during the negative half-cycles, such that the drive circuit is operable to render the first and second switching transistors conductive and non-conductive each half-cycle for controlling the amount of power delivered to the electrical load to the desired amount. Further, the first and second pulse transformers may comprise a single pulse transformer having a single primary winding coupled in series with the triggering circuit, and a secondary winding having a center tap connection.

According to another embodiment of the present invention, the gate drive circuit comprises: (1) a triggering circuit operable to conduct a pulse of current in response to the timing voltage; (2) a first optocoupler having an input photodiode operable to conduct the pulse of current of the triggering circuit during the positive half-cycles of the AC power source; (3) a second optocoupler having an input photodiode operable to conduct the pulse of current of the triggering circuit during the negative half-cycles; (4) a first SR latch having a set input coupled to an output of the first optocoupler; and (5) a second SR latch having a set input coupled to an output of the second optocoupler. The first SR latch comprises an output coupled to the gate of the first switching transistor for rendering the first switching transistor conductive during the positive half-cycles, while the second SR latch comprises an output coupled to the gate of the second switching transistor for rendering the second switching transistor conductive during the negative half-cycles. The reset input of the first SR latch is coupled to the set input of the second SR latch, and the reset input of the second SR latch is coupled to the set input of the first SR latch, such that the switching transistors are rendered conductive in the complementary basis.

Other features and advantages of the present invention will become apparent from the following description of the invention that refers to the accompanying drawings.

DETAILED DESCRIPTION OF THE INVENTION

Figure 1:
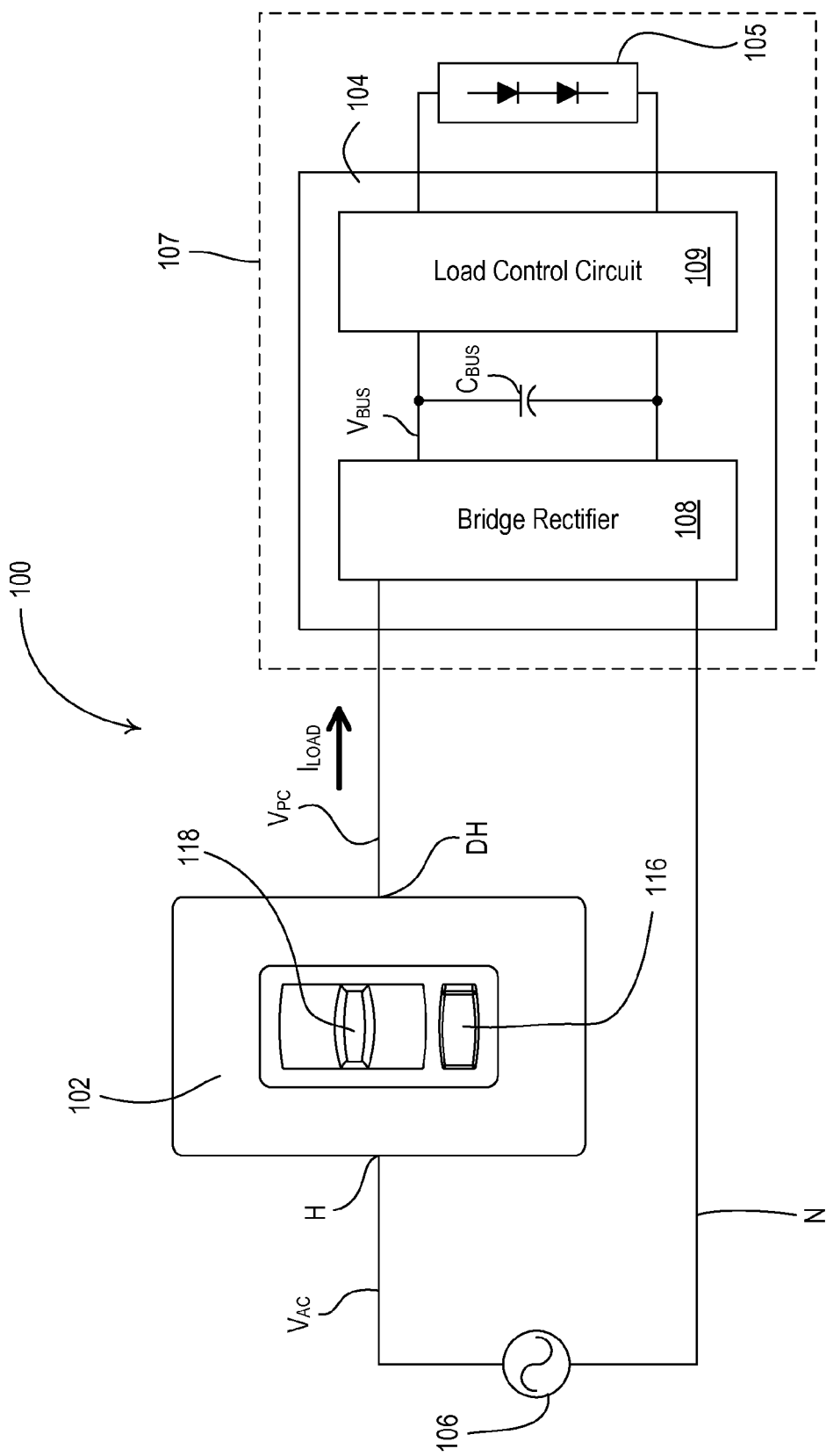
FIG. 1 is a simplified block diagram of a lighting control system including a dimmer switch for controlling the intensity of a lighting load, such as an LED light source, according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a lighting control system 100 including a "two-wire" analog dimmer switch 102 for controlling the amount of power delivered to a load regulation device, e.g., a light-emitting diode (LED) driver 104, to thus control the intensity of a high-efficiency light source, e.g., an LED light source 105. The dimmer switch 102 has a hot terminal H coupled to an alternating-current (AC) power source 106 for receiving an AC mains line voltage $V_{AC}$, and a dimmed-hot terminal DH coupled to the LED driver 104. The dimmer switch 102 does not require a direct connection to the neutral side N of the AC power source 106. The dimmer switch 102 generates a phase-control voltage $V_{PC}$ (e.g., a dimmed-hot voltage) at the dimmed-hot terminal DH and conducts a load current $I_{LOAD}$ through the LED driver 104. The dimmer switch 102 may either use forward phase-control dimming or reverse phase-control dimming techniques to generate the phase-control voltage $V_{PC}$.

As defined herein, a "two-wire" dimmer switch or load control device does not require a require a direct connection to the neutral side N of the AC power source 106. In other words, all currents conducted by the two-wire dimmer switch must also be conducted through the load. A two-wire dimmer switch may have only two terminals (i.e., the hot terminal H and the dimmed hot terminal DH as shown in FIG. 1). Alternatively, a two-wire dimmer switch (as defined herein) could comprise a three-way dimmer switch that may be used in a three-way lighting system and has at least three load terminals, but does not require a neutral connection. In addition, a two-wire dimmer switch may comprise an additional connection that provides for communication with a remote control device (for remotely controlling the dimmer switch), but does not require the dimmer switch to be directly connected to neutral.

The LED driver 104 and the LED light source 105 may be both included together in a single enclosure 107, for example, having a screw-in base adapted to be coupled to a standard Edison socket. The LED driver 104 has two electrical connections: to the dimmer switch 102 for receiving the phase-control voltage $V_{PC}$ and to the neutral side N of the AC power source 106. The LED driver 104 comprises a rectifier bridge circuit 108 that receives the phase-control voltage $V_{PC}$ and generates a bus voltage $V_{BUS}$ across a bus capacitor $C_{BUS}$. The LED driver 104 further comprises a load control circuit 109 that receives the bus voltage $V_{BUS}$ and controls the intensity of the LED light source 105 in response to the phase-control signal $V_{PC}$. Specifically, the load control circuit 109 of the LED driver 104 is operable to turn the LED light source 105 on and off and to adjust the intensity of the LED light source to a target intensity $L_{TRGT}$ (i.e., a desired intensity) in response to the phase-control signal $V_{PC}$. The target intensity $L_{TRGT}$ may range between a low-end intensity $L_{LE}$ (e.g., approximately 1%) and a high-end intensity $L_{HE}$ (e.g., approximately 100%). An example of the LED driver 104 is described in greater detail in U.S. patent application Ser. No. 12/813,908, filed Jun. 11, 2009, entitled LOAD CONTROL DEVICE FOR A LIGHT-EMITTING DIODE LIGHT SOURCE, the entire disclosure of which is hereby incorporated by reference.

Alternatively, the high-efficiency light source could comprise a compact fluorescent lamp (CFL) and the load regulation device could comprise an electronic dimming ballast. In addition, the dimmer switch 102 could alternatively control the amount of power delivered to other types of electrical loads, for example, by directly controlling a lighting load or a motor load. An example of a screw-in light source having a fluorescent lamp and an electronic dimming ballast is described in greater detail in U.S. patent application Ser. No. 12/704,781, filed Feb. 12, 2010, entitled HYBRID LIGHT SOURCE, the entire disclosure of which is hereby incorporated by reference.

The dimmer switch 100 comprises a user interface having a rocker switch 116 and an intensity adjustment actuator 118 (e.g., a slider knob as shown in FIG. 1). The rocker switch 116 allows for turning on and off the LED light source 105, while the intensity adjustment actuator 118 allows for adjustment of the target intensity $L_{TRGT}$ of the LED light source 105 from the low-end intensity $L_{LE}$ to the high-end intensity $L_{HE}$. Examples of user interfaces of dimmer switches are described in greater detail in commonly-assigned U.S. patent application Ser. No. 12/363,258, filed Jan. 30, 2009, entitled LOAD CONTROL DEVICE HAVING A VISUAL INDICATION OF ENERGY SAVINGS AND USAGE INFORMATION, the entire disclosure of which is hereby incorporated by reference.

Figure 2:
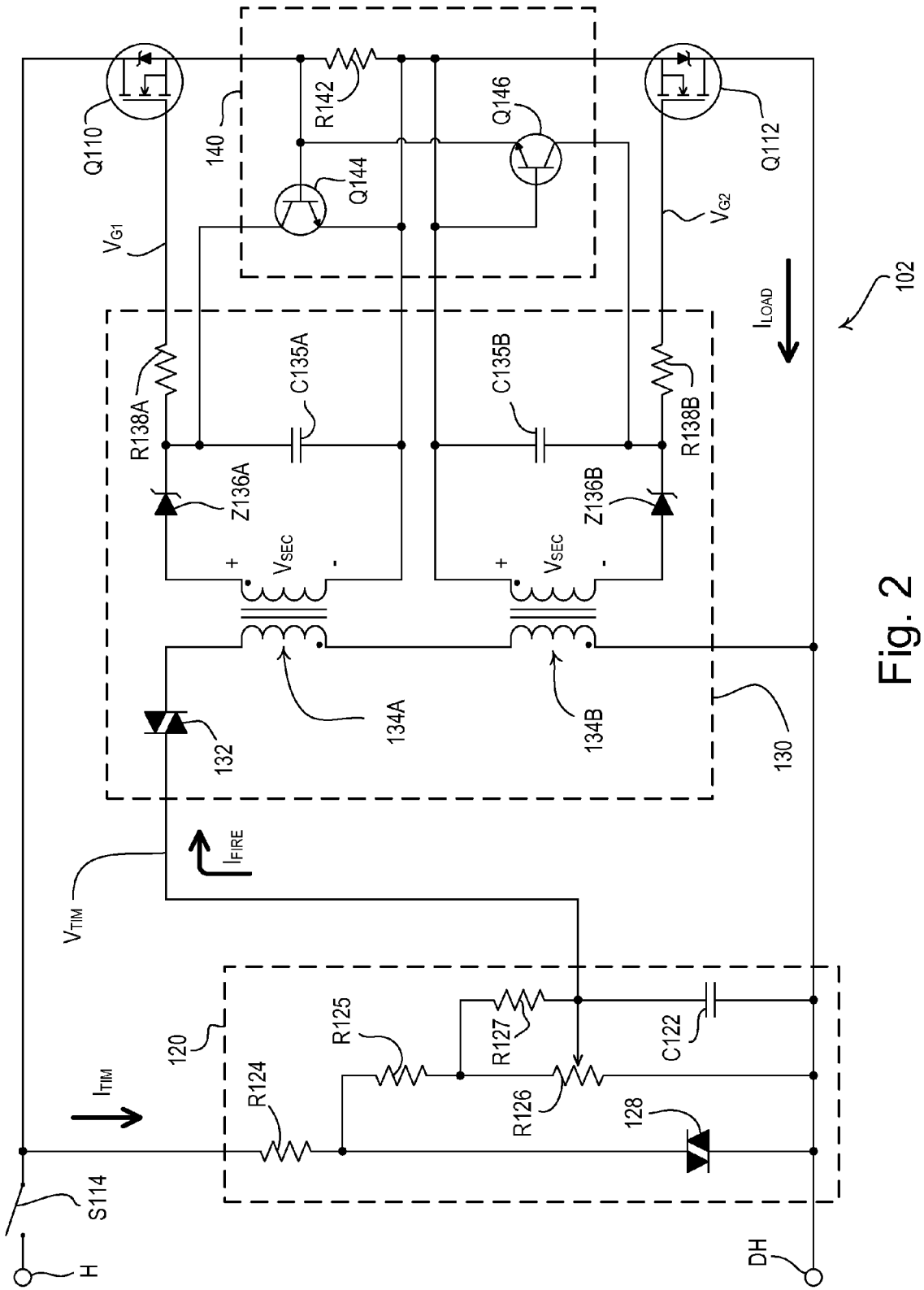
FIG. 2 is a simplified schematic diagram of the dimmer switch of FIG. 1.

FIG. 2 is a simplified schematic diagram of the dimmer switch 102 according to a first embodiment of the present invention. The dimmer switch 102 comprises a bidirectional semiconductor switch having two individual switching transistors, e.g., two field-effect transistors (FETs) Q110, Q112, coupled in anti-series connection between the hot terminal H and the dimmed hot terminal DH for control of the amount of power delivered to the LED driver 104. The FETs Q110, Q112 have control inputs (i.e., gates) that receive respective gate voltages $V_{G1}$, $V_{G2}$ and channel regions that are rendered conductive and non-conductive in response to the respective gate voltages $V_{G1}$, $V_{G2}$. Specifically, the FETs Q110, Q112 are rendered conductive when the magnitudes of the respective gate voltages $V_{G1}$, $V_{G2}$ are controlled to a nominal gate voltage $V_N$ (e.g., approximately 9 V) and are rendered non-conductive when the magnitudes of the respective gate voltages $V_{G1}$, $V_{G2}$ are controlled to approximately zero volts. The FETs Q110, Q112 may alternatively be replaced by any suitable semiconductor switch, such as, for example, insulated gate bipolar junction transistors (IGBT). The dimmer switch 102 comprises a mechanical air-gap switch S114 electrically coupled to the hot terminal H and in series with the FETs Q110, Q112, such that the LED light source 105 is turned off when the switch is open. When the switch S114 is closed, the dimmer switch 102 is operable to control the FETs Q110, Q112 to control the amount of power delivered to the LED driver 104. The switch S114 is mechanically coupled to the rocker switch 116 of the user interface of the dimmer switch 102, such that the switch may be opened and closed in response to actuations of the rocker switch.

Figure 3:
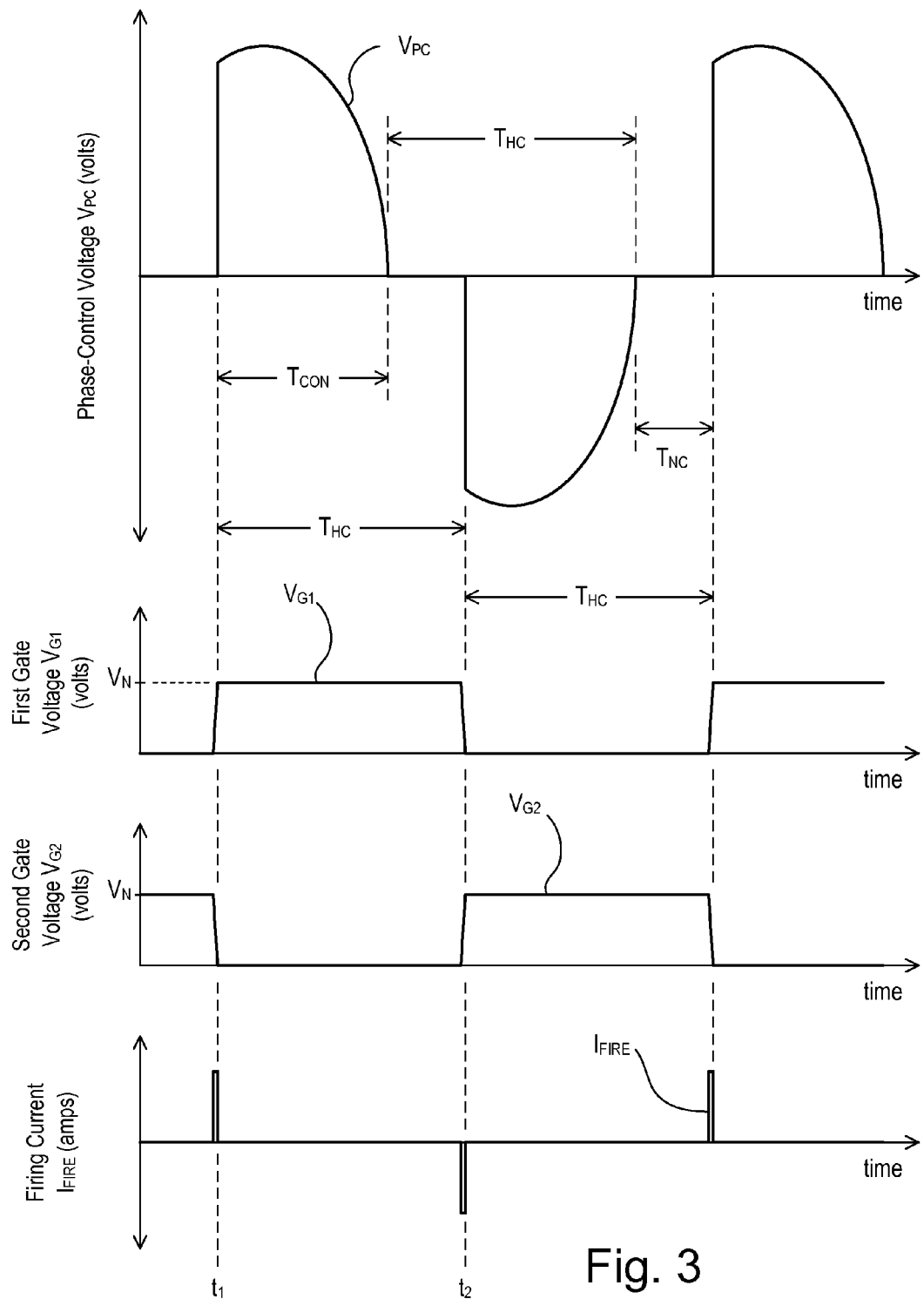
FIG. 3 is a simplified timing diagram showing examples of waveforms illustrating the operation of the dimmer switch of FIG. 1.

FIG. 3 is a simplified timing diagram showing examples of the phase-control voltage $V_{PC}$ generated by the dimmer switch 102 and the gate voltages $V_{G1}$, $V_{G2}$ for driving the FETs Q110, Q112, respectively. As shown in FIG. 3, the phase-control voltage $V_{PC}$ comprises a forward phase-control voltage. In other words, the phase-control voltage $V_{PC}$ has a magnitude of approximately zero volts at the beginning of each half-cycle during a non-conduction time $T_{NC}$, and has a magnitude equal to approximately the magnitude of the AC line voltage $V_{AC}$ of the AC power source 108 during the rest of the half-cycle, i.e., during a conduction time $T_{CON}$. During the positive half-cycles, the first FET Q110 is rendered conductive and the second FET Q112 is rendered non-conductive when the first gate voltage $V_{G1}$ increases from approximately zero volts to the nominal gate voltage $V_N$ (as shown at time $t_1$), and the second gate voltage $V_{G2}$ decreases from the nominal gate voltage $V_N$ to approximately zero volts. At this time, the dimmer switch 102 conducts the load current $I_{LOAD}$ to the LED driver 104 through the first FET Q110 and the body diode of the second FET Q112. At the beginning of the negative half-cycles, the first FET Q110 remains conductive. However, since the second FET Q112 is non-conductive and the body diode of the second FET Q112 is reversed-biased, the dimmer switch 102 does not conduct the load current $I_{LOAD}$ at this time.

During the negative half-cycles, the first FET Q110 is rendered non-conductive and the second FET Q112 is rendered conductive when the first gate voltage $V_{G1}$ decreases from the nominal gate voltage $V_N$ to approximately zero volts and the second gate voltage $V_{G2}$ increases from approximately zero volts to the nominal gate voltage $V_N$ (as shown at time $t_2$). At this time, the dimmer switch 102 conducts the load current $I_{LOAD}$ to the LED driver 104 through the second FET Q112 and the body diode of the first FET Q110. At the beginning of the positive half-cycles, the second FET Q112 remains conductive, the first FET Q110 remains non-conductive, and the body diode of the first FET Q110 is reversed-biased at this time, such that the dimmer switch 102 does not conduct the load current $I_{LOAD}$ until the first FET Q110 is rendered conductive.

Referring back to FIG. 2, the dimmer switch 102 further comprises a timing circuit 120, which is also coupled in series between the hot terminal H and the dimmed hot terminal DH. The timing circuit 120 conducts a timing current $I_{TIM}$ through the LED driver 104 in order to generate a timing voltage $V_{TIM}$ across a capacitor C122 (e.g., having a capacitance of approximately 0.1 µF). The capacitor C122 is operable to charge from the AC power source 108 through resistors R124, R125 (e.g., having resistances of approximately 27 kΩ and 10 kΩ, respectively) and a potentiometer R126. The resistance of the potentiometer R126 may range from, for example, approximately 0 kΩ to 300 kΩ and may be controlled by a user of the dimmer switch 102 (e.g., by actuating a slider control) to adjust the target intensity $L_{TRGT}$ of the LED light source 105. A calibration resistor R127 is coupled to potentiometer R126 for calibrating the range of the potentiometer, and has a resistance of, for example, approximately 300 kΩ. Since the capacitor C122 charges through the potentiometer R126, the rate at which the capacitor C122 charges and thus the magnitude of the timing voltage $V_{TIM}$ are representative of the target intensity $L_{TRGT}$ of the LED light source 105.

A gate drive circuit 130 receives the timing voltage $V_{TIM}$ from the timing circuit 120 and generates the gate voltages $V_{G1}$, $V_{G2}$ for rendering the FETs Q110, Q112 conductive and non-conductive. The drive circuit 130 comprises a diac 132 (e.g., having a break-over voltage $V_{BR1}$ of approximately 32 volts) and two pulse transformers 134A, 134B. The diac 132 is coupled in series with the primary windings of the two pulse transformers 134A, 134B. The secondary windings of the pulse transformers 134A, 134B are coupled to respective capacitors C135A, C135B via respective zener diodes Z136A, Z136B (which each have a break-over voltage $V_{Z1}$ approximately equal to the nominal gate voltage $V_N$, i.e., approximately 9 V). The capacitors C135A, C135B are coupled to the gates of the FETs Q110, Q112 via gate resistors R138A, R138B, respectively (e.g., having resistances of approximately 47 kΩ). The gate resistors R138A, R138B may alternatively have different resistances in order to change the duration of the switching times of the FETs Q110, Q112 as is well known in the art.

When the magnitude of the timing voltage $V_{TIM}$ exceeds approximately the break-over voltage $V_{BR1}$ of the diac 132, the diac conducts a pulse of current (i.e., a firing current $I_{FIRE}$ as shown in FIG. 3) through the primary windings of the pulse transformers 134A, 134B causing secondary voltages $V_{SEC}$ (e.g., approximately 9V) to be generated across the secondary windings of the pulse transformers. During the positive half-cycles, the capacitor C135A charges from the secondary winding of the first pulse transformer 134A through the zener diode Z136A to approximately the nominal gate voltage $V_N$ (i.e., approximately 9 volts). Accordingly, the first gate voltage $V_{G1}$ is driven high from approximately zero volts to the nominal gate voltage $V_N$ rendering the first FET Q110 conductive (as shown at time $t_1$ in FIG. 3). At the beginning of the negative half-cycles, the first FET Q110 is conductive, while the second FET Q112 is non-conductive. Since the body diode of the second FET Q112 is reversed-biased at this time, the dimmer switch 102 does not conduct the load current $I_{LOAD}$.

During the negative half-cycles, the firing current $I_{FIRE}$ has a negative magnitude, thus causing the secondary voltages $V_{SEC}$ across the secondary windings of the pulse transformers 134A, 134B to also have negative magnitudes. Accordingly, the zener diode Z136A is reverse-biased during the negative half-cycles, causing the capacitor C135A to discharge through the zener diode Z136A, such that the voltage across the capacitor C135A is driven to approximately zero volts. As a result, the first gate voltage $V_{G1}$ is driven low from the nominal gate voltage $V_N$ to approximately zero volts rendering the first FET Q110 non-conductive (as shown at time $t_2$ in FIG. 3). In addition, the zener diode Z136B coupled to the secondary winding of the second pulse transformer 134B is forward-biased in the negative half-cycles, such that the capacitor C135B charges to approximately the nominal gate voltage $V_N$ and the second FET Q112 is rendered conductive during the negative half-cycles (as shown at time $t_2$ in FIG. 3). Accordingly, the FETs Q110, Q112 are driven in a complementary manner, such that—at all times—at least one FET is conductive, while the other FET is non-conductive. As a result, the FETs Q110, Q112 are driven to be conductive for approximately the period $T_{HC}$ of a half-cycle and non-conductive for the period $T_{HC}$ of a half-cycle.

The timing circuit 120 also comprises a diac 128 (e.g., having a break-over voltage $V_{BR2}$ of approximately 64V) coupled to the potentiometer R126. The diac 128 provides voltage compensation by adjusting the voltage provided to the potentiometer R126 to compensate for variations in the AC line voltage $V_{AC}$ provided by the AC power source 108. The diac 128 has a negative impedance transfer function, such that the voltage across the diac increases as the current through the diac decreases. Thus, as the voltage across the dimmer switch 102 (i.e., between the hot terminal H and the dimmed hot terminal DH) decreases, the current through the resistor R124 and the diac 128 decreases. As a result, the voltage across the diac 128 increases, thus causing the current flowing through the potentiometer R126 to increase and the firing capacitor C122 to charge at a faster rate. This results in an increased conduction time $T_{CON}$ of the FETs Q110, Q112 during the present half-cycle to compensate for the decreased voltage across the dimmer switch 102, thereby maintaining the intensity of the LED lighting load 106 constant.

The drive circuit 130 is further characterized as having inherent shorted-FET protection. In the event that one of the FETs Q110, Q112 fails shorted, the drive circuit 130 is operable to drive the other, non-shorted FET into full conduction, such that the load current $I_{LOAD}$ is not asymmetric. Asymmetric current can cause some types of lighting loads to overheat. For example, if the second FET Q112 fails shorted, the full AC waveform will be provided to the LED driver 104 during the negative half-cycles. Since there will be approximately zero volts produced across the dimmer switch 102 during the negative half-cycles when second FET Q112 is shorted, the capacitor C122 of the timing circuit 120 will not charge, the diac 132 of the drive circuit 130 will not conduct the pulse of the firing current $I_{FIRE}$, and the voltage across the capacitor C135A will not be driven to zero volts to render the first FET Q110 non-conductive during the negative half-cycles. Accordingly, the first FET Q110 will remain conductive during both half-cycles and the load current $I_{LOAD}$ will be substantially symmetric. The second FET Q112 is controlled to be conductive in a similar manner if the first FET Q110 has failed shorted.

The dimmer switch 102 further comprises an overcurrent protection circuit 140, which comprises a sense resistor R142 (e.g., having a resistance of approximately 0.015Ω). The sense resistor R142 is coupled between the sources of the FETs Q110, Q112, such that a voltage representative of the magnitude of the load current $I_{LOAD}$ is generated across the sense resistor. The voltage generated across the sense resistor R142 is provided to the base of a first NPN bipolar junction transistor (BJT) Q144. The first transistor Q144 is coupled across the capacitor C135A and operates to protect the first FET Q110 in the event of an overcurrent condition during the positive half-cycles. When the magnitude of the load current $I_{LOAD}$ exceeds a predetermined current limit (e.g., approximately 46.6 amps) such that the voltage generated across the sense resistor R142 exceeds the rated base-emitter voltage (e.g., approximately 0.7 volts) of the first transistor Q144, the first transistor is rendered conductive. Accordingly, the first transistor Q144 pulls the first gate voltage $V_{G1}$ at the gate of the first FET Q110 down towards zero volts, thus rendering the first FET non-conductive. The overcurrent protection circuit 140 further comprises a second NPN bipolar junction transistor Q146, which is coupled across the capacitor C135B and operates to protect the second FET Q112 during the negative half-cycles. When the magnitude of the load current $I_{LOAD}$ exceeds the predetermined current limit, the second transistor Q146 is rendered conductive, thus pulling the second gate voltage $V_{G2}$ at the gate of the second FET Q112 down towards zero volts and rendering the second FET non-conductive.

Figure 4:
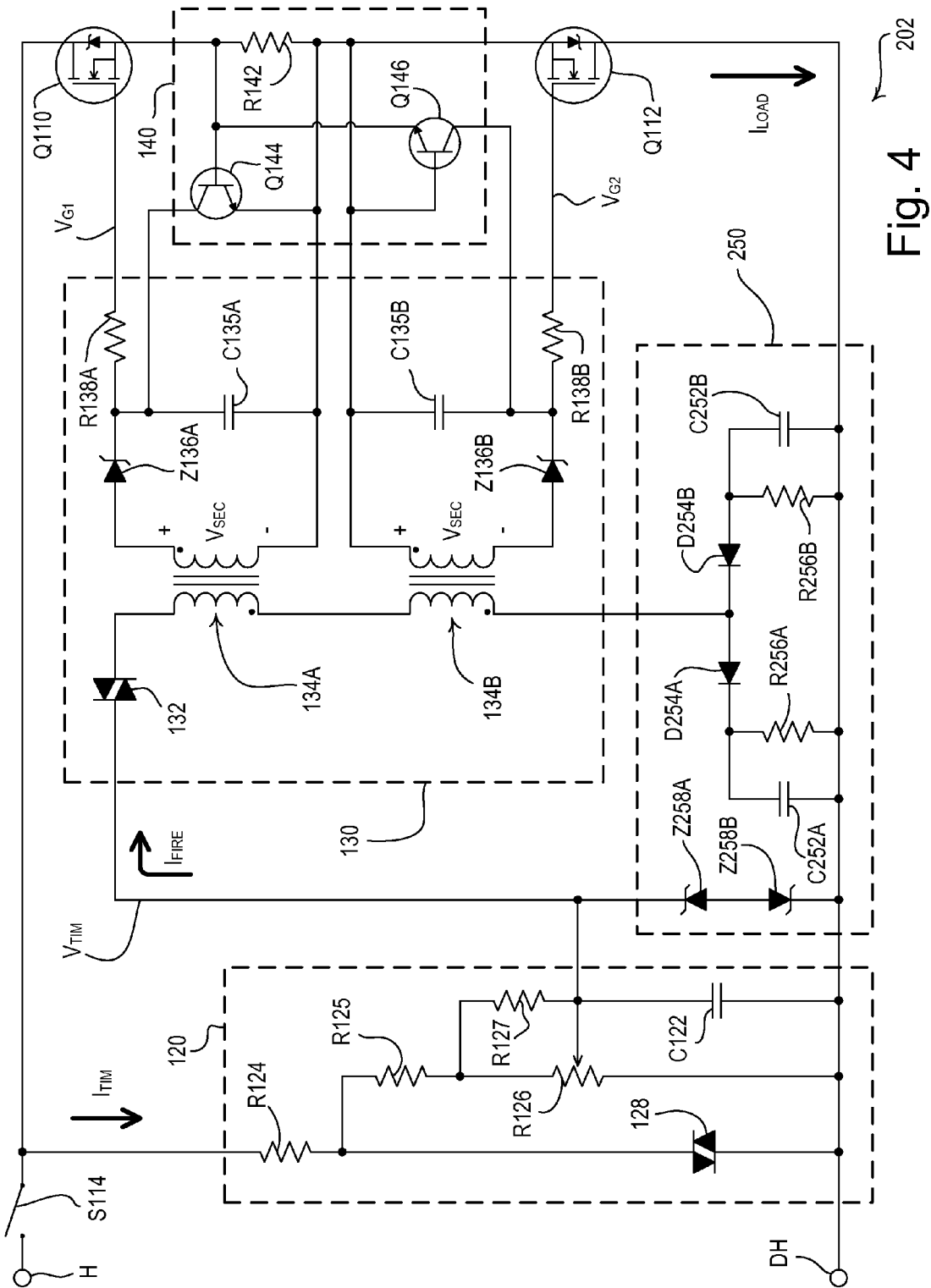
FIG. 4 is a simplified schematic diagram of a dimmer switch for controlling the intensity of a lighting load according to a second embodiment of the present invention.

FIG. 4 is a simplified schematic diagram of a dimmer switch 202 according to a second embodiment of the present invention. The dimmer switch 202 comprises a drive limit circuit 250, which is coupled in series with the diac 132 and the primary windings of the two pulse transformers 134A, 134B of the drive circuit 130. The drive limit circuit 250 operates to limit the number of times that the drive circuit 130 attempts to render the FETs Q110, Q112 conductive during a specific half-cycle. For example, if the overcurrent protection circuit 140 renders one of the FETs Q110, Q112 non-conductive, the drive limit circuit 250 prevents the drive circuit 130 from attempting to render the respective FET conductive again during the present half-cycle.

When the diac 132 fires each half-cycle, the drive limit circuit 250 conducts the firing current $I_{FIRE}$ and generates an offset voltage $V_{OFFSET}$ across a capacitor C252A during the positive half-cycles and a capacitor C252B during the negative half-cycles. The capacitor C252A charges through a diode D254A during the positive half-cycles, and the capacitor C252B charges through a diode D254B during the negative half-cycles. For example, the capacitors C252A, C252B may have capacitances of approximately 0.1 µF. Discharge resistors R256A, R256B are coupled in parallel with the capacitors C252A, C252B, respectively, and each have a resistance of, for example, approximately 33 kΩ. The drive limit circuit 250 further comprises two zener diodes Z258A, Z258B coupled in anti-series connection and each having the same break-over voltage $V_{Z2}$ (e.g., approximately 40V). The zener diodes Z258A, Z58B are coupled to the timing circuit 120 to limit the magnitude of the timing voltage $V_{TIM}$ to a clamp voltage $V_{CLAMP}$, i.e., approximately the break-over voltage $V_{Z2}$, in both half-cycles.

At the beginning of a positive half-cycle, the capacitor C252A of the drive limit circuit 140 has no charge, and thus, no voltage is developed across the capacitor. The timing voltage signal $V_{TIM}$ increases until the magnitude of the timing voltage $V_{TIM}$ exceeds approximately the break-over voltage $V_{BR1}$ of the diac 132. When the diac 132 fires, the diode D254A and the capacitor C252A conduct pulse of the firing current $I_{FIRE}$ and the offset voltage $V_{OFFSET}$ (e.g., approximately 12 volts) is developed across the capacitor C252A. After the diac 132 has finished conducting the firing current $I_{FIRE}$, the voltage across the capacitor C122 decreases by approximately a break-back voltage $V_{BB1}$ (e.g., approximately 10 volts) of the diac 132 to a predetermined voltage $V_P$ (e.g., approximately 22 volts). If the overcurrent protection circuit 140 renders one of the FETs Q110, Q112 non-conductive, the timing voltage signal $V_{TIM}$ will begin to increase again. The magnitude of the timing voltage $V_{TIM}$ must exceed approximately the break-over voltage $V_{BR1}$ of the diac 132 plus the offset voltage $V_{OFFSET}$ across the capacitor C252A (i.e., approximately 44 volts) in order for the diac 132 to conduct the pulse of the firing current $I_{FIRE}$ once again. However, because the zener diode Z258A limits the timing voltage $V_{TIM}$ to the break-over voltage $V_{Z2}$ (i.e., approximately 40 volts), the timing voltage $V_{TIM}$ is prevented from exceeding the voltage threshold $V_{TH}$. Accordingly, the drive circuit 130 is prevented from repeatedly attempting to render the FETs Q110, Q112 conductive during each half-cycle in the event of an overcurrent condition.

The timing voltage $V_{TIM}$ is prevented from exceeding the voltage threshold $V_{TH}$ until the voltage ΔV across the capacitor C252A decays to approximately the break-over voltage $V_{Z2}$ of the zener diode Z258A minus the break-over voltage $V_{BR1}$ of the diac 132. The capacitor C252A discharges slowly through the discharge resistor R256A, such that the time required for the voltage ΔV across the capacitor C252A to decay to approximately the break-over voltage $V_{Z2}$ of the zener diode Z258A minus the break-over voltage $V_{BR1}$ of the diac 132 is long enough such that the drive circuit 130 only attempts to render the FETs Q110, Q112 conductive once during each half-cycle. The voltage across the capacitor C252A decays to substantially zero volts during the negative half-cycle such that the voltage across the capacitor C252A is substantially zero volts at the beginning of the next positive half-cycle. The capacitor C252B, the diode D254B, the discharge resistor R256B, and the zener diode Z258B of the drive limit circuit 250 operate in a similar fashion during the negative half-cycles. An example of the drive limit circuit 250 is described in greater detail in commonly-assigned U.S. Pat. No. 7,570,031, issued Aug. 4, 2009, entitled METHOD AND APPARATUS FOR PREVENTING MULTIPLE ATTEMPTED FIRINGS OF A SEMICONDUCTOR SWITCH IN A LOAD CONTROL DEVICE, the entire disclosure of which is hereby incorporated by reference.

Figure 5:
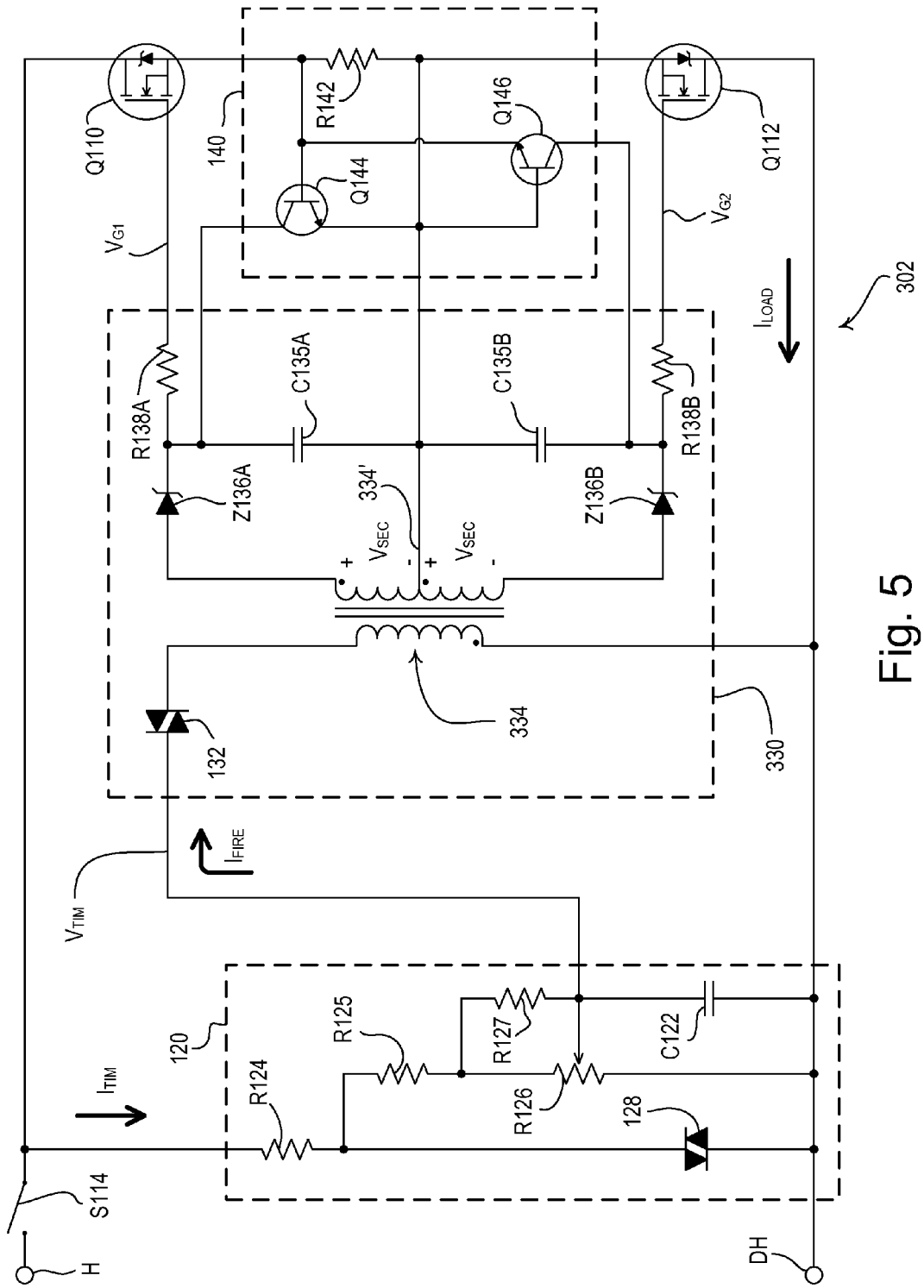
FIG. 5 is a simplified schematic diagram of a dimmer switch for controlling the intensity of a lighting load according to a third embodiment of the present invention.

FIG. 5 is a simplified schematic diagram of a dimmer switch 302 according to a third embodiment of the present invention. The dimmer switch 302 comprises a drive circuit 330 that includes a single pulse transformer 334. The pulse transformer 334 has a single primary winding and secondary winding having a tap connection 334'. The diac 132 is coupled in series with the single primary winding of the pulse transformer 334. The series combination of the diode Z136A and the capacitor C135A is coupled between one end of the secondary winding and the tap connection 334' of the pulse transformer 334. The series combination of the diode Z136B and the capacitor C135B is coupled between the other end of the secondary winding and the tap connection 334' of the pulse transformer 334. The drive circuit 330 of the third embodiment operates to render the FETs Q110, Q112 conductive and non-conductive in the same manner as the drive circuit 130 of the first embodiment.

Figure 6:
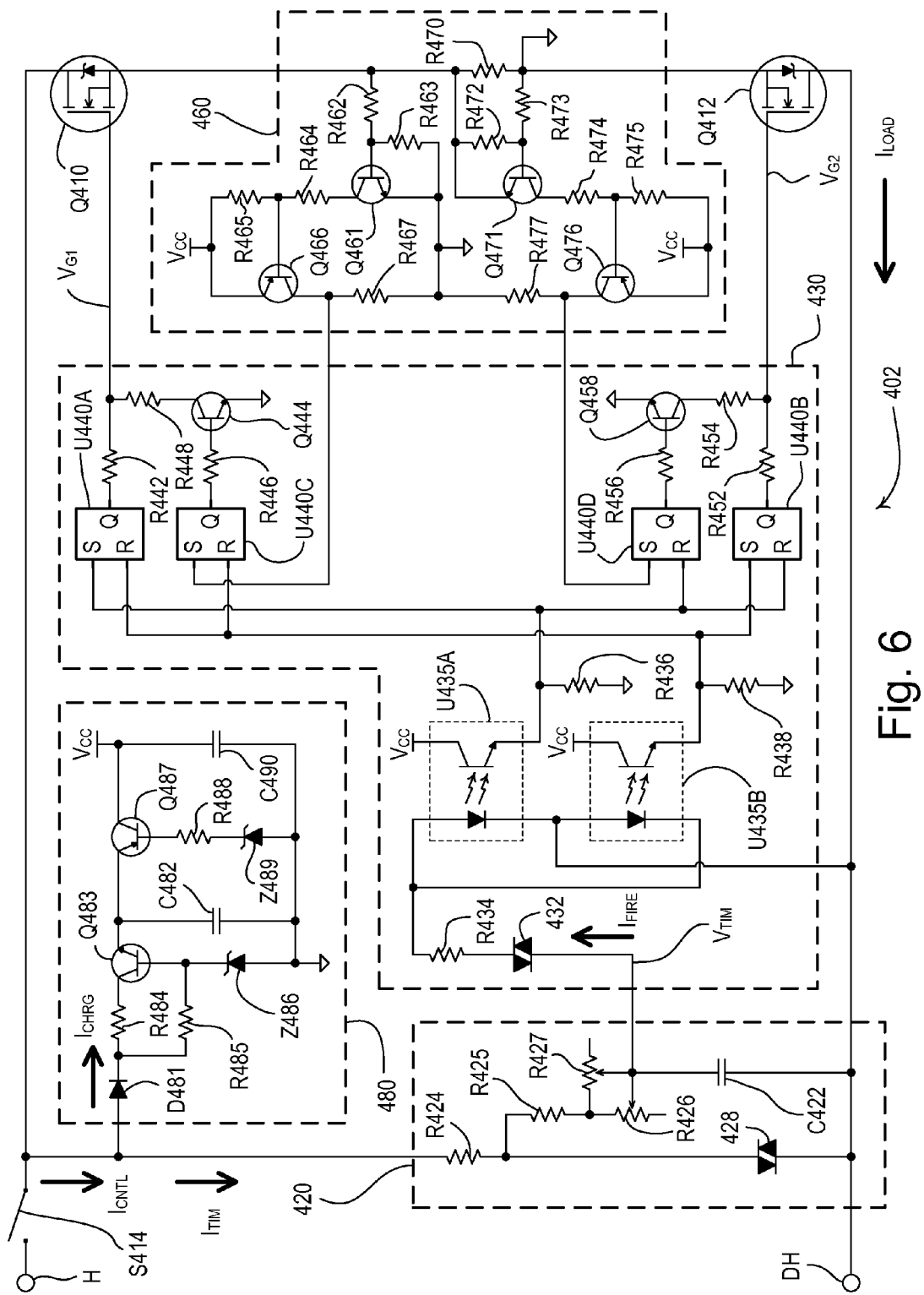
FIG. 6 is a simplified schematic diagram of a dimmer switch for controlling the intensity of a lighting load according to a fourth embodiment of the present invention.

FIG. 6 is a simplified schematic diagram of a dimmer switch 402 according to a fourth embodiment of the present invention. The dimmer switch 402 comprises a mechanical air-gap switch S414 and two field-effect transistors (FETs) Q410, Q412 coupled in anti-series connection between the hot terminal H and the dimmed hot terminal DH for control of the amount of power delivered to the connected LED driver 104. As in the first, second, and third embodiments, the FETs Q410, Q412 have control inputs (i.e., gates) that receive respective gate voltages $V_{G1}$, $V_{G2}$ for rendering the FETs conductive and non-conductive. The LED light source 105 is off when the switch S414 is open, and is on when the switch is closed. The dimmer switch 402 comprises a control circuit that includes a timing circuit 420 and a power supply 480 and is operable to conduct a control current $I_{CNTL}$ through the LED driver 104. The timing circuit 420 conducts a timing current $I_{TIM}$ in order to generate a timing voltage $V_{TIM}$ (as in the first embodiment). The dimmer switch 402 further comprises a drive circuit 430 for rendering the FETs Q410, Q412 conductive and non-conductive in response to the timing voltage $V_{TIM}$ and an overcurrent protection circuit 460 for rendering the FETs Q410, Q412 non-conductive in response to an overcurrent condition through the FETs.

The power supply 480 generates a DC supply voltage $V_{CC}$ (e.g., approximately 14.4 volts) for powering the drive circuit 430 and the overcurrent protection circuit 460. The power supply 480 conducts a charging current $I_{CHRG}$ through the LED driver 104 when the dimmer switch 402 is not conducting the load current $I_{LOAD}$ to the LED driver and the magnitude of the voltage developed across the dimmer switch is approximately equal to the magnitude of the AC line voltage $V_{AC}$. The control current $I_{CNTL}$ conducted through the LED driver 104 is approximately equal to the sum of the timing current $I_{TIM}$ of the timing circuit 420 and the charging current $I_{CHRG}$ of the power supply 480.

The power supply 480 comprises a diode D481 coupled to the hot terminal H (via the switch S414), such that the power supply 480 only charges during the positive half-cycles of the AC power source 108. The power supply 480 includes a pass-transistor circuit that operates to generate the DC supply voltage $V_{CC}$ across a capacitor C482 (e.g., having a capacitance of approximately 10 μF). The pass-transistor circuit comprises an NPN bipolar junction transistor Q483, a resistor R484 (e.g., having a resistance of approximately 220Ω), a resistor R485 (e.g., having a resistance of approximately 470 kΩ), and a zener diode Z486. The capacitor C482 is coupled to the emitter of the transistor Q483, such that the capacitor is able to charge through the transistor. The zener diode Z486 is coupled to the base of the transistor Q483 and has a break-over voltage of, for example, approximately 15V, such that the capacitor C482 is able to charge to a voltage equal to approximately the break-over voltage minus the base-emitter drop of the transistor. Alternatively, the power supply 480 may comprise an additional diode coupled between the dimmed hot terminal DH and the junction of the diode D481 and the resistor R484, such that the power supply is operable to charge in both half-cycles of the AC power source 108.

The power supply 480 further comprises snap-on circuit including a PNP bipolar junction transistor Q487, a resistor R488 (e.g., having a resistance of approximately 22 kΩ), and a zener diode Z489. The resistor R488 and the zener diode Z489 are coupled in series with the base of the transistor Q487. The collector of the transistor Q487 is coupled to a capacitor C490. The zener diode Z489 has a break-over voltage of, for example, approximately 12 V, such that the voltage across the capacitor C482 is coupled across the capacitor C490 when the magnitude of the voltage across the capacitor C482 exceeds approximately the break-over voltage of the zener diode Z489 plus the emitter-base drop of the transistor Q487. When the magnitude of the voltage across the capacitor C482 drops below approximately the break-over voltage of the zener diode Z489 plus the emitter-base drop of the transistor Q487, the voltage across the capacitor C482 is disconnected from the capacitor C490, such that the DC supply voltage will drop to approximately circuit common (i.e., approximately zero volts).

The timing circuit 420 conducts the timing current $I_{TIM}$ and generates the timing voltage $V_{TIM}$ across a capacitor C422 (e.g., having a capacitance of approximately 0.047 μF). The capacitor C422 charges from the AC power source 108 through resistors R424, R425 (e.g., having resistances of approximately 27 kΩ and 10 kΩ respectively) and a potentiometer R426 (e.g., having a resistance ranging from approximately 0 kΩ to 300 kΩ). A calibration potentiometer R427 is coupled across the potentiometer R426 and has, for example, a resistance ranging from approximately 0 to 500 kΩ. The timing circuit 420 further comprises a diac 428, which has a break-over voltage $V_{BR5}$ of, for example, approximately 64V, and operates to provide voltage compensation for the timing circuit (in a similar manner as the diac 128 of the timing circuit 120 of the first embodiment).

The drive circuit 430 generates the gate voltages $V_{G1}$, $V_{G2}$ for rendering the FETs Q410, Q412 conductive and non-conductive on a complementary basis in response to the timing voltage $V_{TIM}$ of the timing circuit 420. The drive circuit 430 comprises a diac 432 (e.g., having a break-over voltage $V_{BR6}$ of approximately 32 volts), a resistor R434 (e.g., having a resistance of approximately 680Ω), and two optocouplers U435A, U435B. When the magnitude of the timing voltage $V_{TIM}$ exceeds approximately the break-over voltage $V_{BR6}$ of the diac 432, the diac conducts a firing current $I_{FIRE}$ through the input photodiode of the first optocoupler U435A during the positive half-cycles, and through the input photodiode of the second optocoupler U435B during the negative half-cycles. Accordingly, the output phototransistor of the first optocoupler U435A is rendered conductive during the positive half-cycles, and the output phototransistor of the second optocoupler U435B is rendered conductive during the negative half-cycles. The output phototransistors of the optocouplers U435A, U435B are between the DC supply voltage $V_{CC}$ and circuit common through respective resistors R436, R438, which each have resistances of, for example, approximately 4.7 kΩ.

The output phototransistors of the optocouplers U435A, U435B are also coupled to set-reset (SR) latches U440A, U440B, U440C, U440D, which operate to generate the gate voltages $V_{G1}$, $V_{G2}$ and to thus render the FETs Q410, Q412 conductive and non-conductive on the complementary basis. For example, the SR latches U440A, U440B, U440C, U440D may be implemented as part of a single integrated circuit (IC), which may be powered by the DC supply voltage $V_{CC}$. As shown in FIG. 6, the output phototransistor of the first optocoupler U435A is coupled to the set input of the first SR latch U440A and to the reset input of the second SR latch U440B. The output phototransistor of the second optocoupler U435B is coupled to the set input of the second SR latch U440B and to the reset input of the first SR latch U440A. The output of the first SR latch U440A is coupled to the gate of the first FET Q410 and the output of the second SR latch U440B is coupled to the gate of the second FET Q412 through respective resistors R442, R452, which each have a resistance of, for example, approximately 47 kΩ.

When the output phototransistor of the first optocoupler U435A is rendered conductive during the positive half-cycles, the output of the first SR latch U440A is driven high towards the DC supply voltage $V_{CC}$ (thus rendering the first FET Q410 conductive), while the output of the second SR latch U440B is driven low towards circuit common (thus rendering the second FET Q412 non-conductive). Similarly, when the output phototransistor of the second optocoupler U435B is rendered conductive during the negative half-cycles, the output of the second SR latch U440B is driven high towards the DC supply voltage $V_{CC}$ (thus rendering the second FET Q412 conductive), while the output of the first SR latch U440A is driven low towards circuit common (thus rendering the first FET Q410 non-conductive). Since the set input of the first SR latch U440A is coupled to the reset input of the second SR latch U440B, and the set input of the second SR latch is coupled to the reset input of the first SR latch, the FETs Q410, Q412 are driven to be conductive and non-conductive in a complementary manner (as in the first embodiment), such that one of the FETs is conductive, while the other FET is non-conductive.

The overcurrent protection circuit 460 is coupled to the set inputs of the third and fourth SR latches U440C, U440D for rendering the FETs Q410, Q412 non-conductive in the event of an overcurrent condition through the FETs. The output of the third SR latch U440C is coupled to the base of an NPN bipolar junction transistor Q444 via a resistor R446 (e.g., having a resistance of approximately 18 kΩ). The collector of the transistor Q444 is coupled to the gate of the first FET Q410 via a resistor R448 (e.g., having a resistance of approximately 330Ω). The drive circuit 430 comprises a similar circuit for coupling the output of the fourth SR latch U440D to the gate of the second FET Q412.

The overcurrent protection circuit 460 comprises a sense resistor R470 (e.g., having a resistance of approximately 0.015Ω). The sense resistor R470 is coupled in series between the FETs Q410, Q412, and circuit common is referenced to one side of the sense resistor (as shown in FIG. 6), such that the magnitude of the voltage generated across the sense resistor is proportional to the magnitude of the load current $I_{LOAD}$. The sense resistor R470 is coupled to the base of an NPN bipolar junction transistor Q461 via a resistor R462 (e.g., having a resistance of approximately 2.2 kΩ). A resistor R463 is coupled between the base and the emitter of the transistor Q461 and has a resistance of, for example, approximately 4.7 kΩ. The emitter of the transistor Q461 is coupled to circuit common and the collector is coupled to the DC supply voltage $V_{CC}$ via two resistors R464, R465 (e.g., having resistances of approximately 18 kΩ and 4.7 kΩ, respectively). The junction of the resistors R464, R465 is coupled to the base of a PNP bipolar junction transistor Q466. The emitter of the transistor Q466 is coupled to the DC supply voltage $V_{CC}$ and the collector is coupled to circuit common through a resistor R467 (e.g., having a resistance of approximately 510Ω). The collector of the transistor Q466 is coupled to the set input of the third SR latch U440C for rendering the first FET Q410 non-conductive in the event of overcurrent conditions during the positive half-cycles. The overcurrent protection circuit 460 comprises a similar circuit (including transistors Q471, Q476, and resistors R472, R473, R474, R475, R477) for rendering the second FET Q412 non-conductive in the event of overcurrent conditions during the negative half-cycles.

In the event of an overcurrent condition during a positive half-cycle, the overcurrent protection circuit 460 drives the set input of the third SR latch U440C high towards the DC supply voltage $V_{CC}$. Thus, the transistor Q444 is rendered conductive pulling the first gate voltage $V_{G1}$ down towards circuit common and rendering the first FET Q410 non-conductive. The output phototransistor of the second optocoupler U435B is coupled to the reset input of the third SR latch U440C, such that the overcurrent protection is reset during the next half-cycle (i.e., the negative half-cycle). Specifically, when the output phototransistor of the second optocoupler U435B is rendered conductive during the negative half-cycles, the reset input of the third SR latch U440C latch is driven high towards the DC supply voltage $V_{CC}$, thus rendering the transistor Q444 non-conductive and allowing the first SR latch U440A to control the first FET Q410. Similarly, the overcurrent protection circuit 460 drives the set input of the fourth SR latch U440D high towards the DC supply voltage $V_{CC}$, thus rendering the second FET Q412 non-conductive in the event of an overcurrent condition during a negative half-cycle. The reset input of the fourth SR latch U440D is driven high when the output phototransistor of the first optocoupler U435A is rendered conductive during the positive half-cycles, thus allowing the second SR latch U440B to once again control the second FET Q412.

While the present invention has been described with reference to the LED drivers 104 for controlling the intensity of the LED light source 105, the dimmer switches 102, 202, 302, 402 could be used to control the amount of power delivered to other types of lighting loads (such as incandescent lamps, halogen lamps, magnetic low-voltage lamps, electronic low-voltage lamps) other types of electrical loads (such as motor and fan loads), and other types of load regulation devices (such as electronic dimming ballasts for fluorescent lamps). This application is related to commonly-assigned U.S. patent application Ser. No. 12/952,920, filed Nov. 23, 2010, entitled TWO-WIRE DIMMER SWITCH FOR LOW-POWER LOADS, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control device for controlling the amount of power delivered from an AC power source to an electrical load, the load control device comprising:
   a bidirectional semiconductor switch arranged to be connected in series electrical connection between the AC power source and the electrical load for conducting a load current from the AC power source to the electrical load, the bidirectional semiconductor switch comprising first and second switching transistors coupled in anti-series connection, the first and second switching transistors each operable to be rendered conductive and to remain conductive independent of the magnitude of the load current conducted through the semiconductor switch;
   an analog control circuit for generating a timing voltage representative of a desired amount of power to be delivered to the electrical load; and
   a drive circuit receiving the timing voltage and rendering the first and second switching transistors conductive and non-conductive each half-cycle in response to the timing voltage, so as to control the amount of power delivered to the electrical load to the desired amount;
   wherein the drive circuit controls the first and second switching transistors on a complementary basis.

2. The load control device of claim 1, wherein the first and second switching transistors comprise first and second FETs, respectively.

3. The load control device of claim 2, wherein the drive circuit renders the first FET conductive during the positive half-cycles and the second FET conductive during the negative half-cycles using forward phase-control dimming.

4. The load control device of claim 3, wherein the drive circuit comprises a first SR latch having an output coupled to the gate of the first FET and a second SR latch having an output coupled to the gate of the second FET; and
   wherein the set input of the first SR latch is coupled to the reset input of the second SR latch, and the set input of the second SR latch is coupled to the reset input of the first SR latch, such that the FETs are rendered conductive in the complementary basis.

5. The load control device of claim 4, further comprising:
   an overcurrent protection circuit including a sense resistor coupled in series with the first and second FETs and operable to generate a voltage having a magnitude representative of the magnitude of the load current, the overcurrent protection circuit operatively coupled to the first and second FETs for rendering the FETs non-conductive in the event of an overcurrent condition in the FETs.

6. The load control device of claim 5, wherein the drive circuit comprises a third SR latch having an output operatively coupled to the first FET for rendering the first FET non-conductive, and a fourth SR latch having an output operatively coupled to the second FET for rendering the second FET non-conductive, the overcurrent protection circuit coupled to the set input of the third SR latch for rendering the first FET non-conductive in the event of an overcurrent condition in the positive half-cycles, the overcurrent protection circuit further coupled to the set input of the fourth SR latch for rendering the second FET non-conductive in the event of an overcurrent condition in the negative half-cycles.

7. The load control device of claim 6, wherein the reset input of the third SR latch is coupled to the set input of the second SR latch, such that the third SR latch stops rendering the first FET non-conductive when the second FET is rendered conductive during the next negative half-cycle; and
wherein the reset input of the fourth SR latch is coupled to the set input of the first SR latch, such that the fourth SR latch stops rendering the second FET non-conductive when the second FET is rendered conductive during the next positive half-cycle.

8. The load control device of claim 4, wherein the drive circuit further comprises a triggering circuit operable to conduct a pulse of current in response to the timing voltage, the drive circuit further comprising a first optocoupler having an input photodiode operable to conduct the pulse of current of the triggering circuit during the positive half-cycles, and a second optocoupler having an input photodiode operable to conduct the pulse of current of the triggering circuit during the negative half-cycles.

9. The load control device of claim 8, wherein the first optocoupler has an output coupled to the set input of the first SR latch and to the reset input of the second SR latch for rendering the first FET conductive and the second FET non-conductive during the positive half-cycles, the second optocoupler having an output coupled to the set input of the second SR latch and the reset input of the first SR latch for rendering the second FET conductive and the first FET non-conductive during the negative half-cycles.

10. The load control device of claim 4, further comprising:
a power supply for generating a DC supply voltage for powering the first and second SR latches.

11. The load control device of claim 10, wherein the power supply comprises a pass-transistor circuit followed by a snap-on circuit.

12. The load control device of claim 3, wherein the drive circuit comprises a first capacitor coupled to a control input of the first FET for rendering the FET conductive during the positive half-cycles, and a second capacitor coupled to a control input of the second FET for rendering the FET conductive during the negative half-cycles.

13. The load control device of claim 12, wherein the drive circuit comprises a first pulse transformer having a secondary winding coupled to the first capacitor, a second pulse transformer having a secondary winding coupled to the second capacitor, and a triggering circuit coupled in series with primary windings of the first and second pulse transformers, the triggering circuit operable to conduct a pulse of current through the primary windings of the pulse transformers in response to the timing voltage for charging the first capacitor during the positive half-cycles and the second capacitor during the negative half-cycles.

14. The load control device of claim 13, wherein the voltage across the first capacitor is controlled to approximately zero volts to render the first FET non-conductive at approximately the same time that the second capacitor charges from the secondary winding of the second pulse transformer to render the second FET conductive during the negative half-cycles; and
the voltage across the second capacitor is controlled to approximately zero volts to render the second FET non-conductive at approximately the same time that the first capacitor charges from the secondary winding of the first pulse transformer to render the first FET conductive during the positive half-cycles.

15. The load control device of claim 14, wherein the drive circuit comprises a first zener diode coupled in series between the secondary winding of the first pulse transformer and the first capacitor, such that the first zener diode forward-biased during the positive half-cycles for charging the first capacitor and reverse-biased during the negative half-cycles for driving the voltage across the first capacitor to approximately zero volts.

16. The load control device of claim 13, wherein the first and second pulse transformers comprise a single pulse transformer having a single primary winding coupled in series with the triggering circuit.

17. The load control device of claim 16, wherein the single pulse transformer has a secondary winding having a center tap connection.

18. The load control device of claim 12, wherein the drive circuit comprises a diac and a pulse transformer having a single primary winding coupled in series with the diac, the pulse transformer further comprising a secondary winding having a center tap connection, the first capacitor operatively coupled between the center tap connection and a first end of the secondary winding, the second capacitor operatively coupled between the center tap connection and a second end of the secondary winding, the diac operable to conduct a pulse of current through the primary winding of the pulse transformer in response to the timing voltage for charging the first capacitor during the positive half-cycles and the second capacitor during the negative half-cycles.

19. The load control device of claim 12, wherein the drive circuit is characterized as having inherent shorted-FET protection, such that the first FET is rendered conductive at all times if the second FET has failed shorted, and vice versa.

20. The load control device of claim 1, wherein the analog control circuit comprises a timing circuit and the timing voltage increases at a rate that is representative of the desired amount of power to be delivered to the load.

21. The load control device of claim 20, wherein the timing circuit is coupled in parallel with the bidirectional semiconductor switch and is configured so as to conduct a timing current through the load.

22. The load control device of claim 21, wherein the drive circuit comprises a capacitor operable to charge from the AC power source through a potentiometer for generating the timing voltage across the capacitor, such that the timing voltage is responsive to the resistance of the potentiometer.

23. The load control device of claim 1, wherein the first FET is rendered conductive and the second FET is rendered non-conductive at substantially the same time during the positive half-cycles, and the first FET is rendered non-conductive and the second FET is rendered conductive at substantially the same time during the negative half-cycles.

24. A two-wire load control device for controlling the amount of power delivered from an AC power source to an electrical load, the load control device comprising:
a bidirectional semiconductor switch arranged to be connected in series electrical connection between the AC power source and the electrical load for conducting a load current from the AC power source to the electrical load, the bidirectional semiconductor switch comprising first and second switching transistors coupled in anti-series connection, the first and second switching transistors each operable to be rendered conductive and to remain conductive independent of the magnitude of the load current conducted through semiconductor switch;

an analog control circuit for generating a timing voltage representative of a desired amount of power to be delivered to the electrical load, the analog control circuit coupled so as to conduct a timing current through the electrical load; and a drive circuit for receiving the timing voltage and independently rendering the first and second switching transistors conductive and non-conductive each half-cycle in response to the timing voltage on a complementary basis.

25. The load control device of claim 24, wherein the first and second switching transistors comprises first and second FETs, respectively.

26. The load control device of claim 25, wherein the drive circuit renders the first FET conductive during the positive half-cycles and the second FET conductive during the negative half-cycles using forward phase-control dimming.

27. The load control device of claim 26, wherein the drive circuit comprises a first SR latch having an output coupled to the gate of the first FET and a second SR latch having an output coupled to the gate of the second FET; and wherein the set input of the first SR latch is coupled to the reset input of the second SR latch, and the set input of the second SR latch is coupled to the reset input of the first SR latch, such that the FETs are rendered conductive in a complementary manner.

28. The load control device of claim 26, wherein the drive circuit comprises a first capacitor coupled to a control input of the first FET for rendering the FET conductive during the positive half-cycles, and a second capacitor coupled to a control input of the second FET for rendering the FET conductive during the negative half-cycles, the drive circuit further comprising a first pulse transformer having a secondary winding coupled to the first capacitor, a second pulse transformer having a secondary winding coupled to the second capacitor, and a triggering circuit coupled in series with primary windings of the first and second pulse transformers, the triggering circuit operable to conduct a pulse of current through the primary windings of the pulse transformers in response to the timing voltage for charging the first capacitor during the positive half-cycles and the second capacitor during the negative half-cycles.

29. The load control device of claim 26, wherein the drive circuit comprises a diac and a pulse transformer having a single primary winding coupled in series with the diac, the pulse transformer further comprising a secondary winding having a center tap connection, the first capacitor operatively coupled between the center tap connection and a first end of the secondary winding, the second capacitor operatively coupled between the center tap connection and a second end of the secondary winding, the diac operable to conduct a pulse of current through the primary winding of the pulse transformer in response to the timing voltage for charging the first capacitor during the positive half-cycles and the second capacitor during the negative half-cycles.

30. The load control device of claim 26, wherein the drive circuit is characterized as having inherent shorted-FET protection, such that the first FET is rendered conductive at all times if the second FET has failed shorted, and vice versa.

31. The load control device of claim 24, wherein the analog control circuit comprises a timing circuit and the timing voltage increases at a rate that is representative of the desired amount of power to be delivered to the load.

32. The load control device of claim 31, wherein the timing circuit is coupled in parallel with the bidirectional semiconductor switch and is configured so as to conduct a timing current through the load.

33. The load control device of claim 32, wherein the drive circuit comprises a capacitor operable to charge from the AC power source through a potentiometer for generating the timing voltage across the capacitor, such that the timing voltage is responsive to the resistance of the potentiometer.

34. The load control device of claim 24, wherein the first FET is rendered conductive and the second FET is rendered non-conductive at substantially the same time during the positive half-cycles, and the first FET is rendered non-conductive and the second FET is rendered conductive at substantially the same time during the negative half-cycles.

35. The load control device of claim 24, wherein the drive circuit controls the first and second FETs on a complementary basis, such that at least one of the FETs is conductive at all times.

36. A gate drive circuit for driving first and second anti-series-connected switching transistors in a load control device for controlling the amount of power delivered from an AC power source to an electrical load, the gate drive circuit configured for receipt of a timing voltage representative of a desired amount of power to be delivered to the electrical load, the gate drive circuit coupled to control inputs of the switching transistors for controlling the switching transistors to be conductive and non-conductive in response to the timing voltage, the gate drive circuit comprising:

a first capacitor coupled to the control input of the first switching transistor for rendering the switching transistor conductive during the positive half-cycles of the AC power source;

a second capacitor coupled to the control input of the second switching transistor for rendering the switching transistor conductive during the negative half-cycles of the AC power source;

a first pulse transformer having a secondary winding operatively coupled to the first capacitor;

a second pulse transformer having a secondary winding operatively coupled to the second capacitor; and a triggering circuit coupled in series with primary windings of the first and second pulse transformers, the triggering circuit operable to conduct a pulse of current through the primary windings of the pulse transformers in response to the timing voltage for charging the first capacitor during the positive half-cycles and the second capacitor during the negative half-cycles, such that the drive circuit is operable to render the first and second switching transistors conductive and non-conductive on a complementary basis each half-cycle for controlling the amount of power delivered to the electrical load to the desired amount.

37. The gate drive circuit of claim 36, wherein the drive circuit controls the first and second switching transistors on a complementary basis, such that at least one of the switching transistors is conductive at all times.

38. The gate drive circuit of claim 36, wherein the first and second pulse transformers comprise a single pulse transformer having a single primary winding coupled in series with the triggering circuit, and a secondary winding having a center tap connection.

39. A gate drive circuit for driving first and second anti-series-connected switching transistors in a load control device for controlling the amount of power delivered from an AC power source to an electrical load, the gate drive circuit configured for receipt of a timing voltage representative of a desired amount of power to be delivered to the electrical load, the gate drive circuit coupled to control inputs of the switching transistors for controlling the switching transistors to be conductive and non-conductive in response to the timing voltage, the gate drive circuit comprising:
- a triggering circuit operable to conduct a pulse of current in response to the timing voltage;
- a first optocoupler having an input photodiode operable to conduct the pulse of current of the triggering circuit during the positive half-cycles of the AC power source;
- a second optocoupler having an input photodiode operable to conduct the pulse of current of the triggering circuit during the negative half-cycles;
- a first SR latch having a set input coupled to an output of the first optocoupler, the first SR latch further comprising an output coupled to the gate of the first switching transistor for rendering the first switching transistor conductive during the positive half-cycles; and
- a second SR latch having a set input coupled to an output of the second optocoupler, the second SR latch further comprising an output coupled to the gate of the second switching transistor for rendering the second switching transistor conductive during the negative half-cycles;
- wherein the reset input of the first SR latch is coupled to the set input of the second SR latch, and the reset input of the second SR latch is coupled to the set input of the first SR latch, such that the switching transistors are rendered conductive on a complementary basis.

40. A load control circuit for coupling in series between an AC source voltage and a load device comprising:
- a controllable bidirectional switch comprising first and second anti-series connected switching transistors for coupling selected portions of positive and negative half-cycles of the AC source voltage to the load device;
- a timing circuit coupled to the AC source voltage for producing a timing signal; and
- a gate drive circuit receiving the timing signal and producing separate first and second complementary drive signals for causing the first and second switching transistors of the bidirectional switch to be conductive for the selected portions of the positive and negative half-cycles, respectively, thereby to provide current to the load device from the AC voltage source during the selected portions of the respective positive and negative half-cycles;
- wherein the gate drive circuit produces the first drive signal during the positive half-cycle and the second drive signal during the negative half-cycle.

41. The load control circuit of claim 40, wherein the first drive signal is generated by a first pulse transformer and the second drive signal is generated by a second pulse transformer and wherein the first and second pulse transformers have series-connected primaries connected to receive the timing signal.

42. The load control circuit of claim 41, wherein the first pulse transformer has a secondary coupled to charge a first capacitor through a first diode for producing the first drive signal during the positive half-cycle, the first capacitor discharging during the negative half-cycle to below a threshold voltage for keeping the bidirectional switch conductive.

43. The load control circuit of claim 42, wherein the second pulse transformer has a secondary coupled to charge a second capacitor through a second diode for producing the second drive signal during the negative half-cycle, the second capacitor discharging during the positive half-cycle to below a threshold voltage for keeping the bidirectional switch conductive.

44. The load control circuit of claim 43, wherein the bidirectional switch comprises first and second anti-series connected FETs, and wherein the first FET has a gate receiving the first drive signal and the second FET has a gate receiving the second drive signal, both FETs having respective channel regions, and wherein when the first FET is rendered conductive by the first drive signal, the second FET is provided with the second drive signal that renders the channel region of the second FET non-conductive, said second FET having a body diode through which the positive half-cycle flows; further wherein when the second FET is rendered conductive by the second drive signal, the first FET is provided with the first drive signal that renders the channel region of the first FET non-conductive, said first FET having a body diode through which the negative half-cycle flows.

45. The load control circuit of claim 44, wherein the load control circuit is inherently protected against an asymmetric voltage being provided to the load device in the event of a short circuit failure in one of said two FETs by driving the non-failing FET into full conduction.

46. The load control circuit of claim 43, wherein the second diode is a second zener diode and the second capacitor discharges through the second zener diode during the positive half-cycle.

47. The load control circuit of claim 42, wherein the first diode is a first zener diode and the first capacitor discharges through the first zener diode during the negative half-cycle.

48. The load control circuit of claim 41, further comprising an overcurrent protection circuit monitoring current in said bidirectional switch and turning off said bidirectional switch if the current exceeds an overcurrent threshold.

49. The load control circuit of claim 48, wherein the overcurrent protection circuit comprises a sense resistor in series with the bidirectional switch and a first transistor coupled to the sense resistor for turning off said first drive signal during the positive half-cycle and a second transistor coupled to said sense resistor for turning off the second drive signal during the negative half-cycle.

50. The load control circuit of claim 40, wherein the timing circuit comprises an RC circuit, with at least one resistive element comprising a variable resistor for setting a charging rate of a capacitor of the RC circuit and for determining timing of said timing signal.

51. The load control circuit of claim 50, wherein the timing circuit comprises a voltage compensation element for maintaining the charging rate of said capacitor constant when the AC source voltage varies.

52. The load control circuit of claim 51, wherein the voltage compensation element comprises a component having an inverse voltage-current characteristic such that when the current through the component decreases, the voltage across the component increases and vice versa, thereby affecting the charging rate of said capacitor.

53. The load control circuit of claim 52, wherein the component comprises a DIAC coupled across a portion of a resistance of said RC circuit and said capacitor.

54. The load control circuit of claim 40, wherein the load control circuit is a dimmer circuit and the load device comprises a lighting load.

55. The load control circuit of claim 54, wherein the lighting load comprises an LED driver driving the LED light source.

56. The load control circuit of claim 54, wherein the lighting load comprises an electronic dimming ballast driving a fluorescent lamp.

57. The load control circuit of claim 40, further comprising a voltage threshold device provided to couple the timing signal to the gate drive circuit, the voltage threshold device triggering to conduct the timing signal at a predetermined voltage level.

58. The load control circuit of claim 57, wherein the voltage threshold device comprises a diac.

59. The load control circuit of claim 40, wherein the selected portions of the positive and negative half-cycles of the AC source voltage comprises forward phase control selected portions.

* * * * *